(12) United States Patent
Pett et al.

(10) Patent No.: US 6,209,108 B1
(45) Date of Patent: Mar. 27, 2001

(54) METHOD FOR TESTING VDSL LOOPS

(75) Inventors: Todd A. Pett, Longmont; Richard H. Fink, Aurora; James W. Nevelle, Highlands Ranch, all of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/384,487

(22) Filed: Aug. 27, 1999

(51) Int. Cl.$^7$ .............................. G06F 11/00; H04L 25/08
(52) U.S. Cl. .............................. 714/43; 370/395; 379/224
(58) Field of Search .................................. 714/43, 46, 47, 714/48, 4, 18, 25, 27, 786; 379/15, 224, 28, 29; 375/10, 261, 262; 370/395, 474, 400, 475, 522

(56) References Cited

U.S. PATENT DOCUMENTS

| | | | |
|---|---|---|---|
| 4,677,627 | * 6/1987 | Hong | 371/57 |
| 5,524,106 | * 6/1996 | Tremel et al. | 370/13 |
| 5,880,615 | * 3/1999 | Bazes | 327/307 |
| 5,887,032 | * 3/1999 | Cioffi | 375/257 |
| 6,075,797 | * 6/2000 | Thomas | 370/468 |
| 6,084,946 | * 7/2000 | Beierle | 379/30 |

OTHER PUBLICATIONS

Bruggemann, H, Signal–to–noise ratio improving system– comprising circuit input for noisy analogue signals, circuit output for digitally stored signals, and comparator, DWPI, ACC–NO: 1982–B9493E, 1–2, Feb. 1982.*

Dapper et al., Method and apparatus for improving the quality of AM compatible digital broadcast system signals in the presence of distortion, EPAB, No. 5809065, 1–1, Sep. 1998.*

* cited by examiner

Primary Examiner—Nadeem Iqbal
(74) Attorney, Agent, or Firm—Brooks & Kushman P.C.

(57) ABSTRACT

A test procedure for a VDSL distribution loop utilizes loop pre-qualification based on information stored in a network database in combination with field tests that are performed to confirm minimum performance capabilities of pre-qualified loops. During qualification, a VDSL test signal is sent on the loop, and SNR and bit error ratios are measured for desired upstream and downstream transmission rates. These measurements are compared to threshold values to verify performance of the loop for VDSL use. Thus, a cost effective test process is provided which allows accurate test data collection for sensitive VDSL distribution loops without the need for any pre-provisioning of the loop, and to allow for validation of the loop configuration database.

8 Claims, 2 Drawing Sheets

METHOD FOR TESTING VDSL LOOPS

TECHNICAL FIELD

The present invention generally relates to testing arrangements for VDSL based communication networks having combined video and data services, and more particularly to an arrangement for testing a physical VDSL network loop/drop to a user location.

BACKGROUND ART

Digital Subscriber Line technology architectures, generally denoted as xDSL, allow digital distribution of data services with traditional narrowband voice transmissions.

One form of xDSL of particular interest to the present invention is VDSL (Very high bit rate Digital Subscriber Line), which is a packet-based transmission architecture used to provide high bandwidth distribution of digital video and data signals to customers. A VDSL-based architecture provides a single platform for supporting bandwidth-intensive applications, such as Internet access, remote LAN access, video conferencing, and video-on-demand, and is the only xDSL technology designed to handle the broadband requirements of video distribution.

VDSL services are typically implemented in an asymmetric form having a maximum downstream transmission capability of about 52 Mbps over twisted pair. Upstream data rates in asymmetric implementations tend to range up to about 3.3 Mbps. A typical VDSL distribution system includes a central office equipped with a host digital terminal (HDT) and arranged to operate as a hub between multiple video information providers (VIPs)/digital service providers (DSPs) and customer dwellings. In a fiber-to-the-neighborhood (FTTN) distribution system, optic fibers (e.g. OC-3c and OC-12c) are used to connect the HDT to a universal service access multiplexer (USAM), which is then connected to a network interface device (NID) located on the customer premises via twisted pair copper wire. A dedicated VDSL loop extends between the NID and an individual customer residence using either a dedicated twisted pair or telephone system twisted pair wire, and a customer interface device, such as a residential gateway or set top box, provides a connection point for a customer television or personal computer. A fiber-to-the-curb (FTTC) distribution system is similar except that a broadband network unit (BNU) is used in place of the USAM, and coaxial cable may be used to connect the BNU, NID, and set top box.

The VDSL signal format is used to carry signals to and from the customer. In these systems, the central office provisions each user for programming access rights, and maintains a profile database for each provisioned customer at the HDT to control the signals/channels that can be viewed by the customer.

In this environment, each of the various components and connections play a critical role in maintaining signal and network integrity. One element of particular concern involves the loop to each customer location. VDSL architectures operate at higher frequencies relative to the other xDSL technologies, and therefore require special considerations during testing to insure accurate collection of data. To date, a suitable test arrangement has yet to be developed which would allow accurate testing of a loop prior to actual provisioning of video/data service to the customer location. Because of service activation overhead and loop configuration database errors, a need exists for an economical and accurate testing process which can emphasize loop pre-qualification, noise measurement, and drop replacement.

DISCLOSURE OF INVENTION

It is an object of the present invention to provide a cost effective VDSL network test process that assures an accurate database is maintained while emphasizing loop database pre-qualification, field verification, and field measurements as part of the overall test process.

In accordance with this and other objects, the present invention provides a method for testing a loop in VDSL-based video and data communication network that includes prequalifying the loop by accessing a network database to compute insertion loss at a predetermined temperature, and determining whether the computed insertion loss exceeds a predetermined threshold level. A set of field measurements are performed to detect actual insertion loss, with the loop being disqualified for VDSL use if the actual insertion loss exceeds the threshold loss level. If the loop has not been disqualified, a field test is performed by transmitting a VDSL test signal from both ends of the loop, and the signal-to-noise ratio and errors are recorded at a predetermined upstream and downstream rate. The measured signal-to-noise ratio is compared with threshold values for the predetermined transmission rate, and the database is updated based on the field test.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
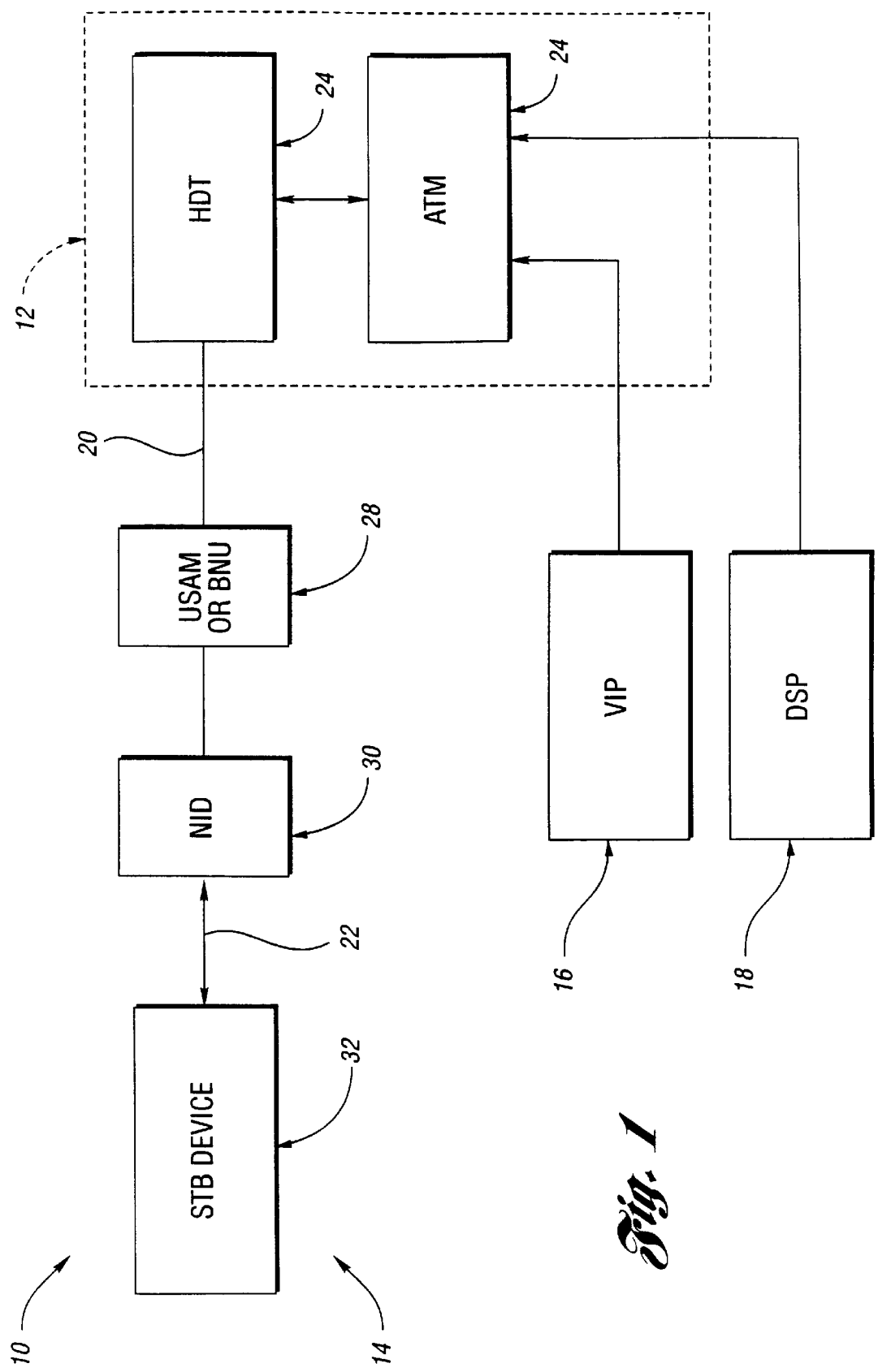
FIG. 1 is a block diagram of a VDSL-based distribution communication system in accordance with an exemplary embodiment of the present invention.

Referring to FIG. 1, a VDSL communication network in accordance with an exemplary embodiment of the present invention is generally indicated at 10 and includes a central office 12 connected to one or more multi-media type service providers and arranged to operate as a network hub for redistributing received signals between the outside service providers and one or more customer sites 14. For example, video signals are provided from an outside video information provider (VIP) 16, and digital data signals are received from an outside data service provider (DSP) 18 such as a suitable Internet server. The central office processes the received signals for retransmission by a VDSL transmission unit onto a distribution line formed from a fiber optic cable 20 and a twisted pair copper cable 22. The central office will include a class 5 digital switch (not shown) for coupling of telephony traffic such as DS-1 service to and from fiber optic cable 20 by way of a host digital terminal. The central office further includes appropriate multiplexer arrangements for supporting transmission of VDSL formatted signals on cable 20, thereby supporting combined narrowband telephony and broadband digital video and data signals on the same distribution line.

It is noted that while the exemplary embodiment of the present invention is described in connection with a VDSL-based system, the present invention can be employed using any type of xDSL format.

The combined signals are preferably transmitted using an asynchronous transfer mode (ATM) protocol on an ATM network 24 located in the central office. Examples of suitable fiber optic cable 20 include OC3c or OC12c cable, while twisted-pair cable 22 in the customer's premises is preferably implemented using Category (CAT) 5 twisted copper pair wire or coaxial cable.

At the central office, the ATM network is coupled to host digital terminal (HDT) 26 which is operative to maintain control over signals sent to the customer via a customer access/entitlement right profile stored in the HDT. The HDT is coupled to at least one USAM or BNU 28 located near a customer site via cable 20. As noted previously, a USAM is used in a FTTN type network configuration, while a BNU is used in a FTTC type network configuration. More specifically, a USAM is located near the customer site within approximately 4,000 feet (≈1220 m) of a network interface device (NID) 30 located at the customer site. A BNU is typically located deeper in the network, such as within 150 feet of the customer building. The USAM or BNU are arranged to operate as a single platform for voice, video, and data signals. The NID is coupled to a set top box (STB) 32 located in the customer building via a coaxial drop.

Figure 2:
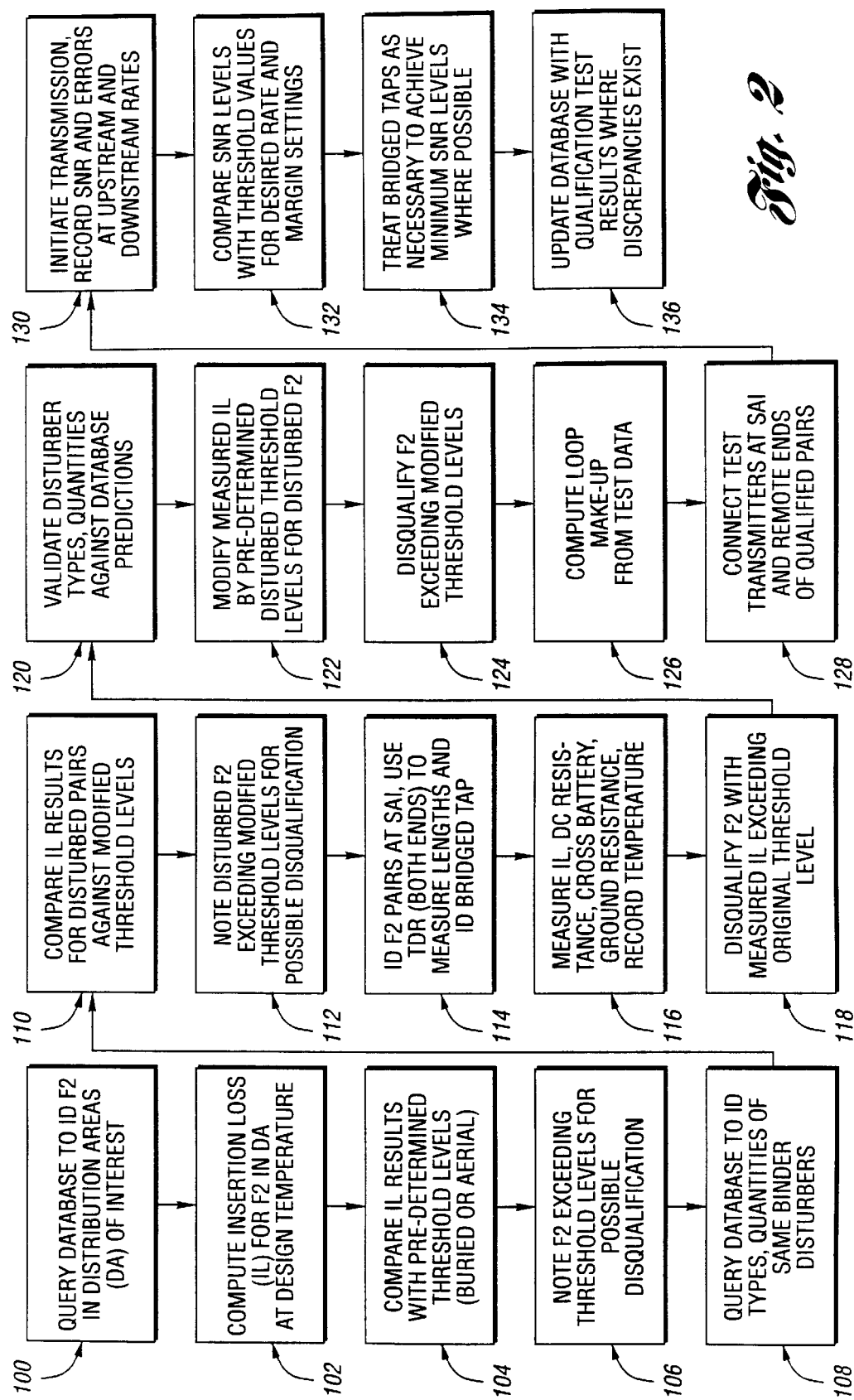
FIG. 2 is flow chart showing the overall testing process of the present invention.

Referring now to FIG. 2, the overall VDSL test process in accordance with the present invention is shown in block diagram form. The first phase of the test process is a loop ID/pre-qualification phase. As part of this phase, a loop database is queried at block 100 to identify the existence of copper plant loops in distribution areas of interest, i.e., "F2" distribution segments in 3–5 kft range, including 24 and 26 AWG buried and aerial feeds. This step identifies the VDSL loops to be tested. At block 102, each F2 loop is analyzed to compute insertion loss at the design temperature, and the insertion loss computations are compared to predetermined threshold levels for aerial and buried feeds at block 104. As denoted at block 106, F2 loops exceeding a threshold level are flagged for possible disqualification.

At block 108, the database is again queried to determine the types and quantities of binder disturbers. Binder disturbers are possible sources of interference, such as an ADSL circuit, which are offensive to VDSL signaling. As denoted at block 110, the predetermined threshold levels are then modified for the loop pairs that are identified as being disturbed, and the insertion loss computations of block 102 are compared against the modified threshold levels. The F2 loops exceeding modified threshold levels are flagged for possible disqualification at block 112.

After completion of the loop pre-qualification phase, a field validation phase is executed. As denoted at block 114, F2 loop pairs are identified at serving area interface (SAI), i.e., an F1–F2 connection crossbox, and both ends of the loop are disconnected in preparation for test. A time domain reflectometer (TDR) is used at both ends to determine the position and segment lengths corresponding to any bridge taps in the loop. This step of the process is for verifying either that no bridge taps exist in the F2 segment, or identify their position to allow removal or treatment during testing. At block 116, measurements are made and recorded for actual insertion loss, DC resistance, cross battery, ground resistance, and temperature. As denoted at block 118, any F2 loop having a measured insertion loss exceeding the computed threshold level is disqualified for VDSL use. At block 120, actual disturber types and quantities are determined and validated against the database predictions of block 108.

Then, at block 122, the measured insertion loss levels are modified by a predetermined amount for each of the disturbed F2 loops. Disturbed F2 loops are then compared to the modified measured insertion levels, and as indicated at block 124, all loops exceeding the modified threshold are disqualified for VDSL use. As denoted at block 126, loop make-up is then determined from the accumulated test data, which is then compared to that indicated by database at block 100. Any differences are stored as an update to the database.

After completion of the field validation phase, the next phase is a VDSL performance test phase. More specifically, as denoted at block 128, video test signal transmitters/receivers are connected at a crossbox (SAI), and remote ends of qualified loops. At block 130, a video test signal is then transmitted and the corresponding SNR is recorded for both the upstream and downstream rates. In addition, the bit error ratio (BER) is measured for transmissions at a desired rate. As denoted at block 132, the SNR levels are compared with threshold values associated with desired rate and margin settings. Bridged taps are treated as necessary at block 134, such as by removal or termination, to maximize levels of SNR when possible. At block 136, the database is updated with field qualification test results if discrepancies exist.

Thus, the present invention provides VDSL loop pre-qualification, validation, and performance approval without any provisioning of a loop for receipt of video programming or data services from VIPs or DSPs. The test process of the present invention assures accurate test data is collected for a VDSL distribution network/loop in a cost effective manner. In addition, testing isolation is achieved, thereby providing testing that is not affected by problems originated from a VIP or DSP.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for testing a VDSL loop in VDSL-based video and data communication network comprising:

prequalifying the loop comprising accessing a network database to compute insertion loss at a predetermined temperature, and determining whether the computed insertion loss exceeds a predetermined threshold level;

performing a set of field measurements to detect actual insertion loss;

disqualify the loop for VDSL use if the actual insertion loss exceeds the computed threshold insertion loss;

performing a field test if the loop has not been disqualified, the field test comprising transmitting a VDSL test signal from both ends of the loop, and recording signal-to-noise ratio and errors for a predetermined upstream and downstream rate;

comparing the measured signal-to-noise ratio with threshold values for the predetermined transmission rate; and updating the database based on the field test.

2. The method of claim 1 wherein performing a set of field measurements further comprises measuring DC line resistance to determine loop configuration and TDR tests to measure loop length.

3. The method of claim 1 wherein updating the database comprises verifying the correctness of loop data stored as a result of the field test.

4. The method of claim 1 wherein prequalifying the loop further comprises accessing the database to determine if a loop is disturbed by identifying a type and quantity of sources of interference in use on loops within a particular binder group.

5. The method of claim 4 further comprising modifying the predetermined insertion loss threshold level if the loop is disturbed.

6. The method of claim 5 further comprising flagging a loop for possible disqualification if the modified insertion loss threshold level is exceeded.

7. The method of claim 4 wherein performing the set of field measurements further comprises validating the identified type and quantities of sources of interference by identifying actual types and quantities of interference present on the loop.

8. The method of claim 1 further comprising flagging a loop for possible disqualification if the insertion loss threshold level is exceeded.

* * * * *